US008201150B2

(12) United States Patent
Ghiloni et al.

(10) Patent No.: US 8,201,150 B2
(45) Date of Patent: Jun. 12, 2012

(54) EVALUATING SOFTWARE TEST COVERAGE

(75) Inventors: Joshua D. Ghiloni, Durham, NC (US); Wes Hayutin, Raleigh, NC (US); Howard S. Krovetz, Holly Springs, NC (US); Seth A. Schwartzman, Elkins Park, PA (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/688,627

(22) Filed: Mar. 20, 2007

(65) Prior Publication Data
US 2008/0235633 A1 Sep. 25, 2008

(51) Int. Cl.
*G06F 9/44* (2006.01)
*G06F 11/00* (2006.01)
*G06F 15/177* (2006.01)
*G06F 3/00* (2006.01)
*G06F 3/048* (2006.01)

(52) U.S. Cl. ............... 717/125; 714/25; 714/39; 714/46; 714/48; 714/57; 717/124; 715/762; 715/735; 715/811

(58) Field of Classification Search .................... None
See application file for complete search history.

(56) References Cited

U.S. PATENT DOCUMENTS

| | | | |
|---|---|---|---|
| 5,351,247 A | 9/1994 | Dow et al. | |
| 5,410,648 A | 4/1995 | Pazel | |
| 5,600,789 A * | 2/1997 | Parker et al. | 714/38.11 |
| 5,634,002 A * | 5/1997 | Polk et al. | 714/38.14 |
| 5,740,408 A | 4/1998 | Bonne et al. | |
| 5,790,117 A | 8/1998 | Halviatti et al. | |
| 5,926,638 A | 7/1999 | Inoue | |
| 6,341,361 B1 | 1/2002 | Basto et al. | |
| 6,425,096 B1 | 7/2002 | Liese et al. | |
| 6,438,713 B1 | 8/2002 | Taira et al. | |
| 6,681,351 B1 * | 1/2004 | Kittross et al. | 714/724 |
| 6,725,399 B1 | 4/2004 | Bowman | |
| 6,725,449 B1 | 4/2004 | Maeda et al. | |

(Continued)

OTHER PUBLICATIONS

Hilbert, "A Survey of Computer-Aided Techniques for Extracting Usability Information from User Interface Events", 1998, Department of Information and Computer Science, University of California, Irvine.*
Macleod et al., "The Development of DRUM: A Software Tool for Video-assisted Usability Evaluation", 1993, National Physical Laboratory.*

(Continued)

*Primary Examiner* — Lewis A Bullock, Jr.
*Assistant Examiner* — Christine Dang
(74) *Attorney, Agent, or Firm* — Law Office of Jim Boice

(57) ABSTRACT

A computer-implementable method, system and computer media are presented for calculating software test coverage of a Graphical User Interface (GUI). In one embodiment, the method includes the steps of: detecting an activation of a monitored active area in a GUI; recording the activation and a name of a user who activated the monitored active area; recording an order of any prior and subsequent activations of active areas in the GUI, wherein the prior and subsequent activations are performed prior to and subsequent to the activation of the monitored active area; recording any errors associated with the activation of the monitored active area; recording a total number of times that the monitored active area was activated during a pre-determined test period; and creating a report that describes test results for the monitored active area.

14 Claims, 8 Drawing Sheets

U.S. PATENT DOCUMENTS

| | | | |
|---|---|---|---|
| 6,766,475 | B2 | 7/2004 | Segal et al. |
| 6,785,884 | B1 | 8/2004 | Rieschl |
| 6,804,634 | B1 | 10/2004 | Holzmann et al. |
| 6,895,578 | B1 | 5/2005 | Kolawa et al. |
| 6,907,546 | B1 | 6/2005 | Haswell et al. |
| 6,959,431 | B1 | 10/2005 | Shiels et al. |
| 7,055,137 | B2* | 5/2006 | Mathews ............... 717/125 |
| 7,107,174 | B2* | 9/2006 | McGrath et al. ......... 702/123 |
| 7,246,273 | B2* | 7/2007 | Zheng et al. ............ 714/57 |
| 7,900,089 | B2* | 3/2011 | Hayutin et al. ......... 714/26 |
| 2002/0133807 | A1 | 9/2002 | Sluiman |
| 2003/0070120 | A1* | 4/2003 | Michael et al. ......... 714/38 |
| 2003/0103310 | A1* | 6/2003 | Shirriff ................... 361/119 |
| 2003/0236775 | A1 | 12/2003 | Patterson |
| 2004/0041827 | A1 | 3/2004 | Bischof et al. |
| 2004/0153774 | A1* | 8/2004 | Gavish et al. ........... 714/25 |
| 2004/0204894 | A1 | 10/2004 | McGrath et al. |
| 2005/0257198 | A1* | 11/2005 | Stienhans et al. ....... 717/124 |
| 2006/0271830 | A1 | 11/2006 | Kwong et al. |
| 2008/0162992 | A1* | 7/2008 | Lonowski ............... 714/25 |
| 2008/0282230 | A1* | 11/2008 | Belvin et al. ........... 717/125 |
| 2009/0265689 | A1* | 10/2009 | Gooi et al. ............. 717/125 |
| 2009/0320002 | A1* | 12/2009 | Peri-Glass et al. ...... 717/131 |

OTHER PUBLICATIONS

Berner, S. et al. "Observations and Lessons Learned from Automated Testing", ICSE'05, May 2005, St. Louis, Missouri.

Memon, A. et al. "Automating Regression Testing for Evolving GUI Software", Journal of Software Maintenance and Evolution: Research and Development, vol. 17, No. 1, pp. 27-62, 2005, AN-8492709.

Memon A. et al. "Coverage Criteria for GUI Testing", pp. 256-267 ESEC/FSE, 2001, Vienna, Austria.

Sun, Y. et al. "Specification-Driven Automated Testing of GUI-Based Java Programs", ACMSE'04, Apr. 2004, Huntsville, Alabama.

U.S. Appl. No. 11/423,569, First Office Action dated Sep. 18, 2008.

U.S. Appl. No. 11/423,569, First Response dated Dec. 17, 2008.

U.S. Appl. No. 11/423,569, Second Office Action dated Mar. 6, 2009.

U.S. Appl. No. 11/423,569, Second Response dated Sep. 8, 2009.

U.S. Appl. No. 11/423,569, Third Office Action dated Dec. 10, 2009.

U.S. Appl. No. 11/423,569, Third Response dated Apr. 21, 2010.

U.S. Appl. No. 11/423,569, Fourth Office Action dated Jul. 12, 2010.

U.S. Appl. No. 11/423,569, Fourth Response dated Oct. 12, 2010.

* cited by examiner

444 ANALYZED AND MODIFIED AGGREGATE TEST RUN

| COMPOSITE TEST RUN '1' 420 | COMPOSITE TEST RUN '2' 428 | COMPOSITE TEST RUN '3' 436 |
|---|---|---|
| [CLOSE ALL BROWSERS] | ADD'L. STEPS IN TEST RUN 1  502 | [CLOSE ALL BROWSERS] |
| [OPEN ALL BROWSERS] | [OPEN NEW BROWSER] | [OPEN NEW BROWSER] |
| URL:"HTTP://LOCALHOST.. | [URL:"HTTP://LOCALHOST..] | [URL:"HTTP://LOCALHOST..] |
| [WPS LOGIN:"WPSADMI..] | [WPS LOGIN:"WPSADMI..] | [WPS LOGIN:"WPSADMI..] |
| ADD'L. STEPS IN TEST RUN 2  504 | CLICK "ADMINISTRATOR" | ADD'L. STEPS IN TEST RUN 2  504 |
| CLICK ON "PDM PORTLET" | CLICK "PAGES" | CLICK "PDM PORTLET" |
| CLICK "NEW" | CLICK ON [SEARCH] FIELD | CLICK "NEW" |
| CLICK ON "RICH TEXT DOC" | CLICK ON "PDM PORTLET" | CLICK ON "RICH TEXT DOC" |
| CLICK ON [NAME] FIELD | CLICK "MY PORTAL" | CLICK ON [NAME] FIELD |
| TYPE "NEW RICH TEXT..." | CLICK "PDM PORTLET" | TYPE "NEW RICH TEXT" |
| CLICK "OK" | CLICK ON "RICH TEXT DOC" | CLICK "OK" |
| CLICK ON [SEARCH] FIELD | CLICK ON [NAME] FIELD | CLICK ON [SEARCH] FIELD |
| TYPE "NEW RICH TEXT..." | TYPE "NEW RICH TEXT..." | TYPE "NEW RICH TEXT..." |
| CLICK "SEARCH" | CLICK "OK" | CLICK "OK" |
| SEARCH FOR "NEW RICH" | CLICK ON [SEARCH] FIELD | CLICK ON [SEARCH] FIELD |
| CLICK "SEARCH" | TYPE "NEW RICH TEXT..." | TYPE "NEW RICH TEXT..." |
| [CLOSE BROWSER] | CLICK "SEARCH" | SEARCH FOR "NEW RICH..." |
| ADD'L. STEPS IN TEST RUN 3  506 | ADD'L. STEPS IN TEST RUN 3  506 | CLICK "OPEN" |
| | | [CLOSE BROWSER] |

FIG. 5

| SEQUENCE | TIMES TESTED | NUMBER OF ERRORS RECORDED |
|---|---|---|
| aaaad | 14 | 0 |
| aaabd | 23 | 0 |
| aaacd | 137 | 1 |
| aaadd | 1 | 0 |
| aaaed | 0 | N/A |
| aaafd | 0 | N/A |
| aaada | 6 | 0 |
| ⋮ | ⋮ | ⋮ |

FIG. 8

EVALUATING SOFTWARE TEST COVERAGE

BACKGROUND OF THE INVENTION

The present invention relates in general to the field of computers and other data processing systems, including hardware, software and processes. More particularly, the present invention pertains to evaluating software test coverage of active areas in a Graphical User Interface (GUI).

Testing is a key aspect of software development. A common test procedure is "beta testing," in which a preliminary version of software is released to a limited number of users. That is, during beta testing, users are allowed to use the new software, often without having to pay anything, in return for helping the software developer evaluate how the new software functions in a realistic environment. After beta testing, the software developer will then roll out the product to the general public. Oftentimes, the rolled-out product will include certain testing claims, such as "this product was extensively tested for six months." This has very little meaning, since the statement does not describe what "extensively tested" means.

SUMMARY OF THE INVENTION

In order to provide a manner in which software testing, especially that performed on a large-scale, can be evaluated with specificity, a computer-implementable method, system and computer media are presented herein for accurately calculating software test coverage using Graphical User Interface (GUI) automation tools. In one embodiment, the method includes the steps of: detecting an activation of a monitored active area in a GUI; recording the activation and a name of a user who activated the monitored active area; recording an order of any prior and subsequent activations of active areas in the GUI, wherein the prior and subsequent activations are performed prior to and subsequent to the activation of the monitored active area; recording any errors associated with the activation of the monitored active area; recording a total number of times that the monitored active area was activated during a pre-determined test period; and creating a report that describes test results for the monitored active area, wherein the report describes how many times the monitored active area was activated, error information related to activations of the monitored active area, and which active areas were and were not tested.

The prior and subsequent activations may include at least one activation of the monitored active area, such as a button, that was originally being monitored and tested. In a preferred embodiment, the monitored active area is duplicated and presented on multiple monitored computers, wherein the report consolidates information regarding activation frequency for, and errors associated with, all duplicated monitored active areas on the multiple monitored computers, as well as the sequence of events surrounding a given monitored active area for the purposes of reporting testing coverage.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 5 is a generalized depiction of a modified aggregate test procedure as implemented in accordance with an embodiment of the present invention;

FIG. 8 depicts an exemplary report detailing fall sequence coverage related to the pop-up information given in FIG. 7.

DETAILED DESCRIPTION OF AN ILLUSTRATIVE EMBODIMENT

Figure 1:
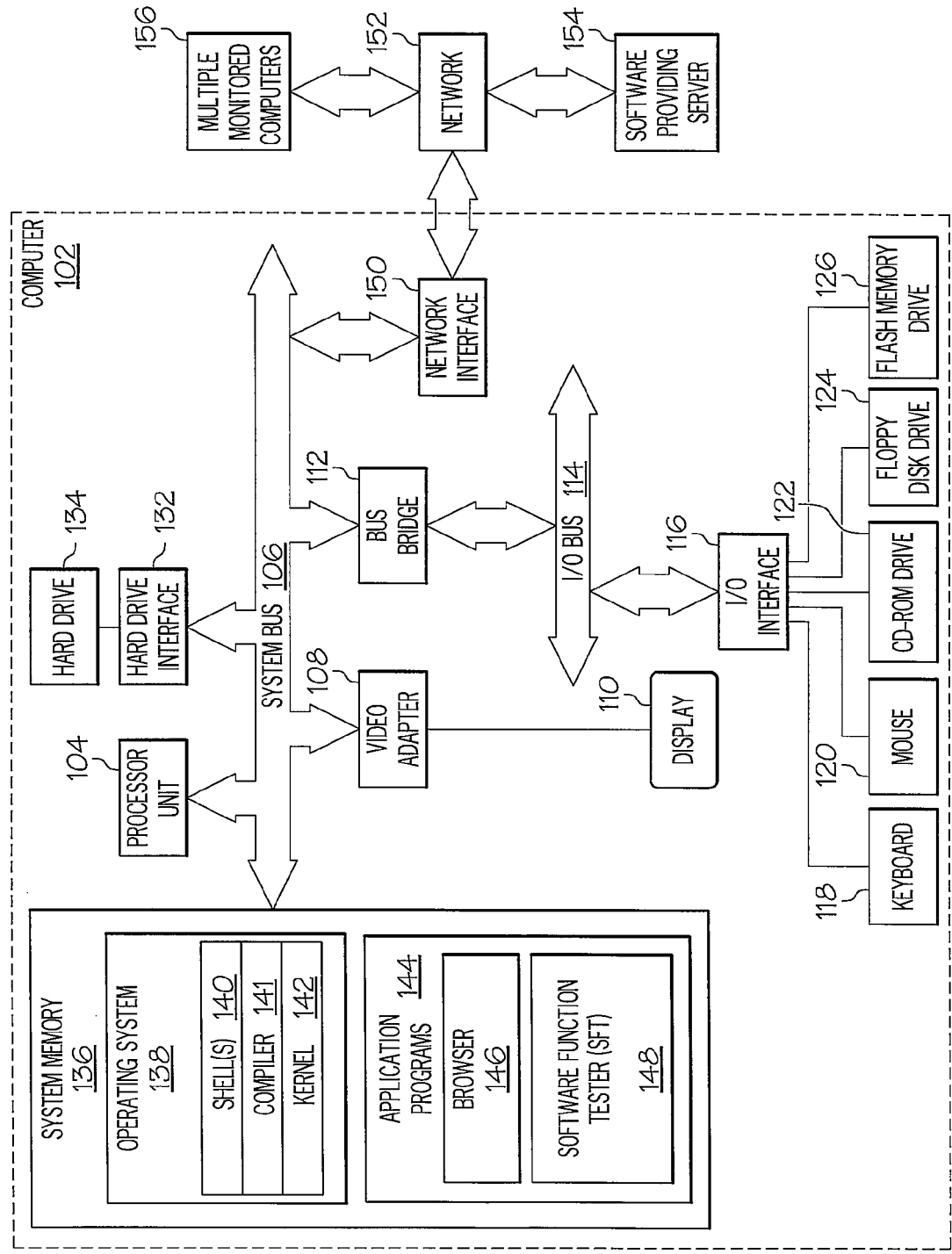
FIG. 1 depicts an exemplary computer in which the present invention may be implemented.

With reference now to FIG. 1, there is depicted a block diagram of an exemplary computer 102, in which the present invention may be utilized. Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software providing server 154 via a network 152 using a network interface 150, which is coupled to system bus 106. Network 152 may be an external network such as the Internet, or an internal network such as an Ethernet or a Virtual Private Network (VPN). Using network 152, computer 102 is able to use the present invention to access software providing server 154 as well as the multiple monitored computers 156. As described below, software providing server 154 may be called on to assist computer 102 in monitoring and testing active areas in a Graphical User Interface (GUI), and the multiple monitored computers 156 are computers that each have a duplicate copy of the GUI displayed in their system's video monitor.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory may include additional higher levels of volatile memory (not shown), including but not limited to cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

OS 138 also includes a compiler 141 that is utilized by users of computer 102 to transform high level source code into executable (i.e. executable) object code. In an alternate embodiment, compiler 141 may be included in application programs 144.

Application programs 144 include a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software providing server 154.

Application programs 144 in computer 102's system memory also include Software Function Tester (SFT) 148. SFT 148 includes code for implementing and generating the functions and GUIs depicted in FIGS. 2-7, which are discussed below. Although illustrated as a single component, in some embodiments SFT 148 may be formed of multiple software components.

In a preferred embodiment, software providing server 154 downloads SFT 148 to computer 102 in an "on-demand" basis, in which SFT 148 is deployed and/or downloaded to computer 102 only when needed and/or requested by computer 102. Note further that, in a preferred embodiment of the present invention, software providing server 154 performs all of the functions associated with the present invention (including execution of SFT 148), thus freeing computer 102 from using its own resources.

Also coupled to network 152 are multiple monitored computers 156, which are testing a software program such as that described below in FIG. 2. For example, multiple monitored computers 156 may be beta testing a limited released version of this software program that is under test, including the testing being performed under the direction of SFT 148.

The hardware elements depicted in computer 102 are not intended to be exhaustive, but rather represent and/or highlight certain components that may be utilized to practice the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention. Note also that the architecture described for client computer 102 may be incorporated, in part or in whole, into the architecture utilized by software providing server 154 and/or multiple monitored computers 156.

Thus, it is understood that the use herein of specific names are for example only and not meant to imply any limitations on the invention. The invention may thus be implemented with different nomenclature/terminology and associated functionality utilized to describe the above devices/utility, etc., without limitation.

Figure 2:
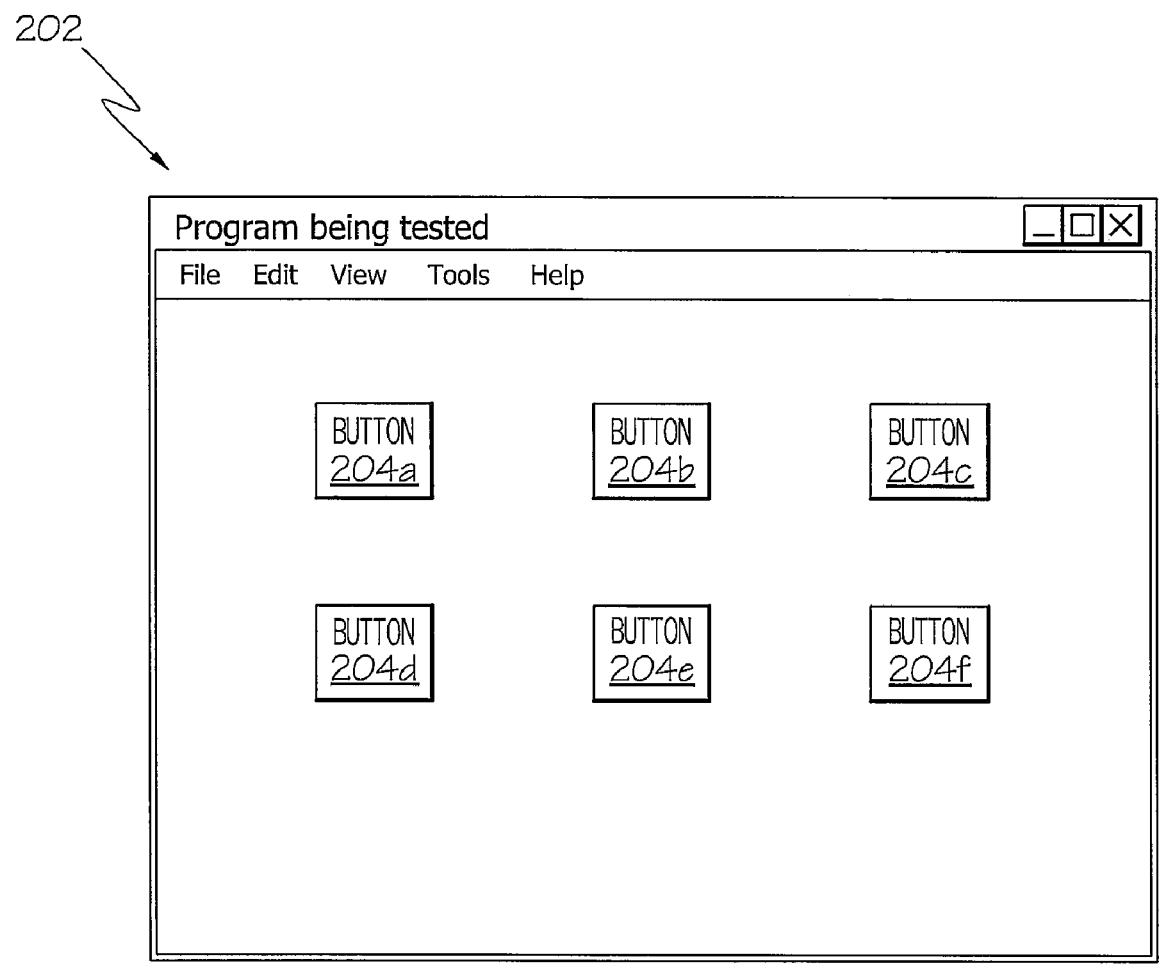
FIG. 2 illustrates an exemplary Graphical User Interface (GUI) that displays active buttons that are to be tested.

With reference now to FIG. 2, a Graphical User Interface (GUI) 202 of a program being tested is shown. GUI 202 includes multiple active areas, which may be buttons, links, functions, icons for executing objects or macros, etc. For exemplary purposes, these active areas are described as "buttons," and their activation is referred to as "clicking," in reference to clicking a mouse button to activate the active area.

Assume for purposes of illustration that there are six buttons 204*a-f* on GUI 202. During testing of the program, it is desired to know not only which buttons 204 are clicked and how often, but what order they are clicked. For example, if button 204*a* is clicked, and then button 204*b* is clicked, and then button 204*c* is clicked, this might generate an error that does not occur if these buttons are clicked in another order (e.g., button 204*a*, then 204*c*, and then 204*b*). An exemplary tool for such monitoring and tracking is shown in FIGS. 3-5.

Figure 3:
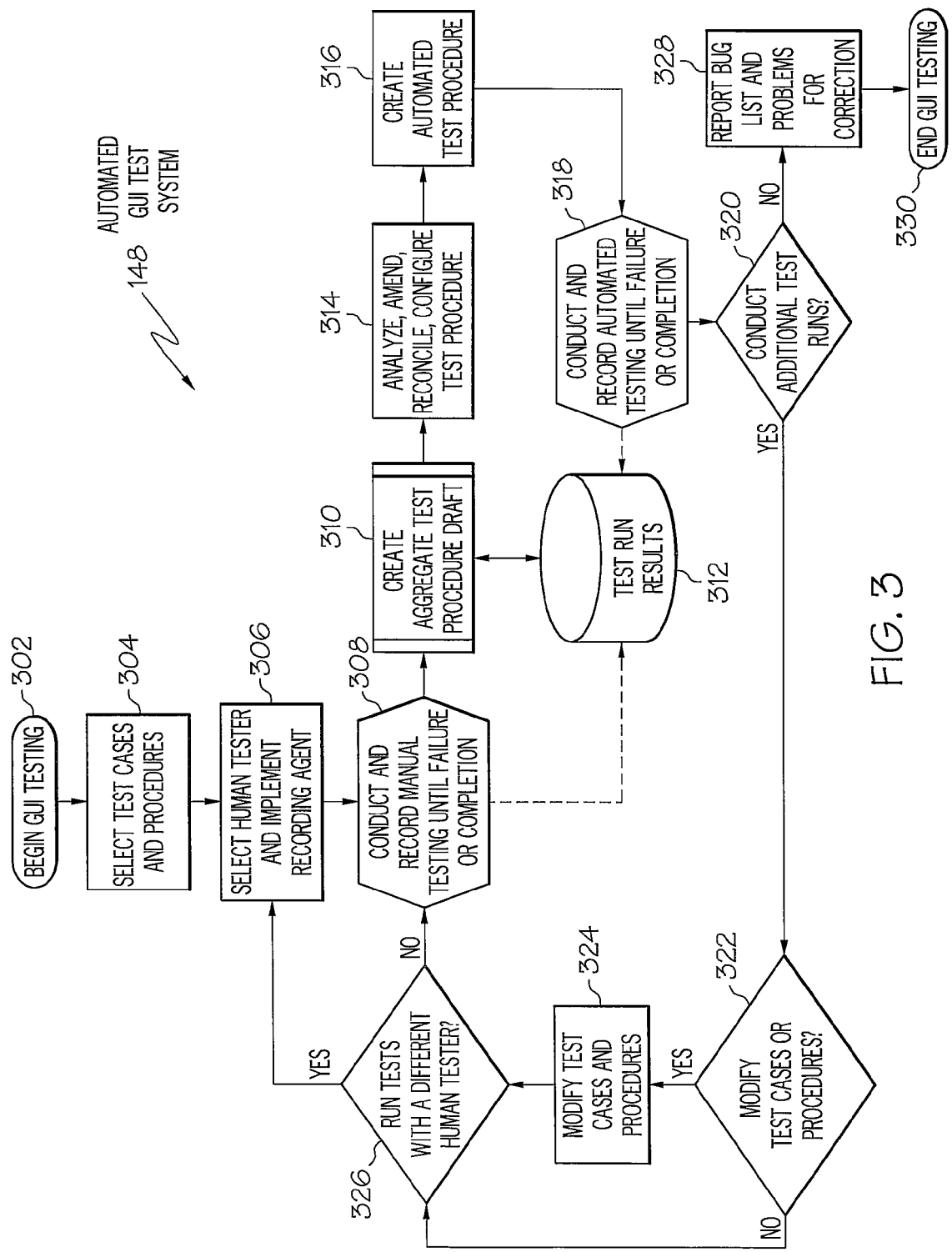
FIG. 3 is a flow chart of exemplary steps used in an error-tolerant and adaptive automated GUI test system as implemented in accordance with an embodiment of the present invention.
Figure 4:
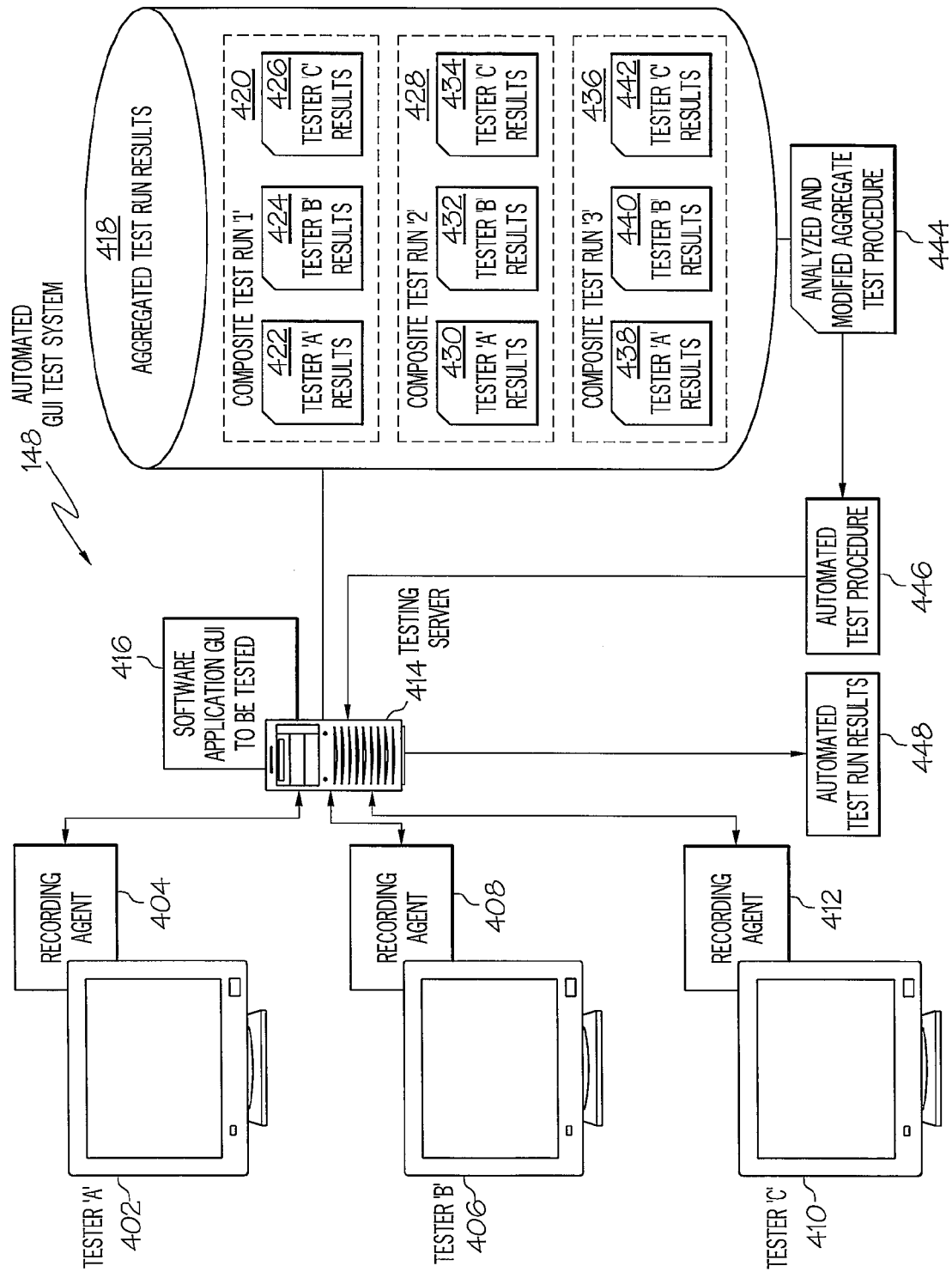
FIG. 4 is a block diagram of an exemplary error-tolerant and adaptive automated GUI test system as implemented in accordance with an embodiment of the present invention.

FIG. 3 is a generalized flow chart of an error-tolerant and adaptive automated graphical user interface (GUI) test system, which may be a feature of SFT 148 or may be a stand-alone application, as implemented in accordance with an embodiment of the invention. In Step 302, testing of a software application's GUI begins. In Step 304, predetermined test cases and procedures to be implemented by human testers during testing are selected. In Step 306, a human tester is selected to conduct testing, and a recording agent is implemented on their computer.

A test run is conducted in Step 308 by the tester enacting the predetermined test cases or procedures, during which, known inputs are compared against preconditions and expected outputs are compared against the resulting postconditions to test the anticipated operation of a subject application's GUI. Once testing of the GUI has failed or completed in Step 308, the recorded inputs, preconditions, interactions, outputs and postconditions of the test run are added to the results of prior test runs in Step 312, with the resulting compilation of test run results then used to create a draft of an aggregate test procedure draft in Step 310. The aggregate test procedure draft is then analyzed to identify failure points common to two or more test runs as well as the operating anomalies and disparities of individual test runs, which are then manually amended, reconciled and/or configured in Step 314.

For example, in an embodiment of the invention, individual test runs are deconstructed to various levels of granularity (e.g., a step within a test, a task within a step, a command within a task, etc.) and then compared for common actions, differences, unexpected actions or anomalies that occurred during the test run. In another embodiment of the invention, a draft set of actions is produced using a rules-based decision engine, with rule considerations including, but not limited to, the respective characteristics of human testers (e.g., novice, expert, etc.), and the frequency and commonality of tasks in the test runs. In yet another embodiment of the invention, results of the analysis that do not share commonalities are displayed in a "diff" utility so testing administrators can manually choose the appropriate actions (e.g., add, remove, modify, configure, etc.) for individual elements of the aggregate test procedure draft. Likewise, while commonalities between test run results may normally be trusted as reliable and not require the administrator's attention, the ability to make modifications to the aggregate test procedure draft is retained. Alternative testing paths and individual tester's reactions to abnormalities in different test runs can similarly be examined, edited and/or incorporated for use as alternative testing actions.

An automated test procedure is then created in Step 316 from the amended, reconciled and configured test procedure draft created in Step 314 for implementation in an automated testing environment. In Step 318, automated playback of the automated test procedure created in Step 316 enacts the same predetermined test cases or procedures manually enacted in Step 308, during which known inputs are compared against preconditions and expected outputs are compared against the resulting postconditions to test the anticipated operation of the subject application's GUI. Once testing of the GUI has failed or completed in Step 318, the recorded inputs, preconditions, interactions, outputs and postconditions of the test run are then added to the results of prior test runs in Step 312.

If it is decided in Step 320 to conduct additional test runs, it is then decided in Step 322 whether to modify the current test cases and/or procedures. If it is decided in Step 322 to modify the current test cases and/or procedures, they are modified in Step 324 and it is then decided in Step 326 whether to run tests with a different human tester. If it is decided in Step 326 to run tests with a different human tester, then a human tester is selected in Step 306 and the test run is continued as described in greater detail hereinabove. Otherwise, the current human tester then enacts predetermined test cases or procedures in Step 308 and continues the test run as described in greater detail hereinabove. If it is decided in Step 322 to continue using the current test cases and/or procedures, it is then decided in Step 326 whether to run tests with a different human tester. If it is decided in Step 326 to run tests with a different human tester, then a human tester is selected in Step 306 and the test run is continued as described in greater detail hereinabove. Otherwise, the current human tester then enacts predetermined test cases or procedures in Step 308 and the test run is continued as described in greater detail hereinabove.

If it is decided in Step 320 to not conduct additional test runs, then a software bug list and other problems are reported in Step 328 and GUI testing is ended in Step 330. It will be apparent to those of skill in the art that different embodiments of the invention become progressively error-tolerant and adaptive as the number and variety of human testers increases. Furthermore, the invention does not require the development of custom test procedures nor does it rely on random manipulations of the GUI application. Instead, data from human users following test cases or procedures during test runs is gathered and correlated to generate an automated test procedure that can navigate and test a software application's GUI in an error-tolerant and adaptive manner. In addition, the resulting software GUI test runs are reliable, recordable and auditable, thereby providing verifiable documentation that is often required for compliance certification.

FIG. 4 is a generalized block diagram of an error-tolerant and adaptive automated GUI test system, including that found in SFT 148, as implemented in accordance with an embodiment of the invention. This error-tolerant and adaptive automated GUI test system comprises testing computers for human tester 'A' 402, 'B' 406, and 'C' 410, testing server 414, aggregated test run results 418, analyzed and modified aggregate test procedure 444, automated test procedure 446, and automated test run results 448. Testing server 414 comprises subject software application GUI to be tested 416, and aggregated test run results 418 comprises composite test run '1' results 420, composite test run '2' results 428, and composite test run '3' results 436. Composite test run '1' results 420 comprises test run '1' results from tester 'A' 422, test run '1' results from tester 'B' 424, and test run '1' results from tester 'C' 426. Composite test run '2' results 428 comprises test run '2' results from tester 'A' 430, test run '2' results from tester 'B' 432, and test run '2' results from tester 'C' 434. Composite test run '3' results 436 comprises test run '3' results from tester 'A' 438, test run '3' results from tester 'B' 440, and test run '3' results from tester 'C' 442.

In different embodiments of the invention, recording agents 404, 408, 412, are respectively implemented on testing computers for human tester 'A' 402, 'B' 406, and 'C' 410, and testing of software application's GUI 416 (e.g., GUI 202), comprising testing server 414, is initiated. Predetermined test cases and procedures are selected and enacted by human testers 'A' 402, 'B' 406, 'C' 410, during which known inputs are compared against preconditions and expected outputs are compared against the resulting postconditions to test the anticipated operation of a subject software application's GUI 416 comprising testing server 414 during a test run. Once each tester's testing of the software application's GUI 416 has failed or completed in a test run, inputs, preconditions, interactions, outputs and postconditions of the respective test run captured by recording agents 404, 408, 412 are added to the results of prior test runs comprising aggregated test run results 418.

Aggregated test run results 418 are analyzed to identify failure points common to two or more test runs as well as the operating anomalies and disparities of individual test runs, which are then manually amended, reconciled and/or configured as described in greater detail hereinabove to create analyzed and modified aggregate test procedure 444. Automated test procedure 446 is created from analyzed and modified aggregate test procedure 444 and implemented on testing server 414 for automated testing of subject software application's GUI 416 resulting in automated test run results 448.

In an embodiment of the invention, respective results from a first test run for tester 'A' 422, tester 'B' 424, and tester 'C' 426 are combined into composite test run '1' 420, which is then analyzed to identify failure points common to each tester's individual test results, as well as their individual operating anomalies and disparities, which are then manually amended, reconciled and/or configured as described in greater detail hereinabove to create analyzed and modified aggregate test procedure 444. Automated test procedure 446 is created from analyzed and modified aggregate test procedure 444 and implemented on testing server 414 (e.g., computer 102) for automated testing of subject software application's GUI 416 resulting in automated test run results 448, which are used as input to make changes to subject software application's GUI 416.

A second test run is made with the respective results for tester 'A' 430, tester 'B' 432, and tester 'C' 434 combined into composite test run '2' 428, which is then analyzed and/or modified as described in greater detail hereinabove to create analyzed and modified aggregate test procedure 444. A second error-tolerant, adaptive automated test procedure 446 is created and implemented for automated testing of subject software application's GUI 416 resulting in automated test run results 448, which are used as input to make subsequent changes to subject software application's GUI 416.

A third test run is then made with the respective results for tester 'A' 438, tester 'B' 440, and tester 'C' 442 combined into composite test run '3' 436, which is then analyzed and/or modified as described in greater detail hereinabove to create analyzed and modified aggregate test procedure 444. A third automated test procedure 446 is created and implemented for automated testing of subject software application's GUI 416 resulting in automated test run results 448. It will be apparent to those of skill in the art that each successive test run implementing automated test procedure 446 becomes progressively more error-tolerant an adaptive by incorporating the results from prior test runs.

FIG. 5 is a generalized depiction of modified aggregate test procedure 444 as implemented in accordance with an embodiment of the invention. Modified aggregate test procedure 444 comprises composite test run '1' results 420, composite test run '2' results 428, and composite test run '3' results 436. Composite test run '1' results 420 comprises test steps comprising test run '1', additional test steps from test run '2' 504, and additional test steps from test run '3' 506. Composite test run '2' results 428 comprises test steps comprising test run '2', additional test steps from test run '1' 502, and additional test steps from test run '3' 506. Composite test run '3' results 436 comprises test steps comprising test run '3' and additional test steps from test run '2' 504.

As described in greater detail hereinabove, analyzed and modified aggregate test procedure 444 is a result of identifying failure points common to two or more test runs as well as the operating anomalies and disparities of individual test runs, which are then manually amended, reconciled and/or configured, which in turn is used to create error-tolerant, adaptive automated test procedure 446, which is implemented on testing server 414 for automated testing of subject software application's GUI 416 resulting in automated test run results 448.

Figure 6:
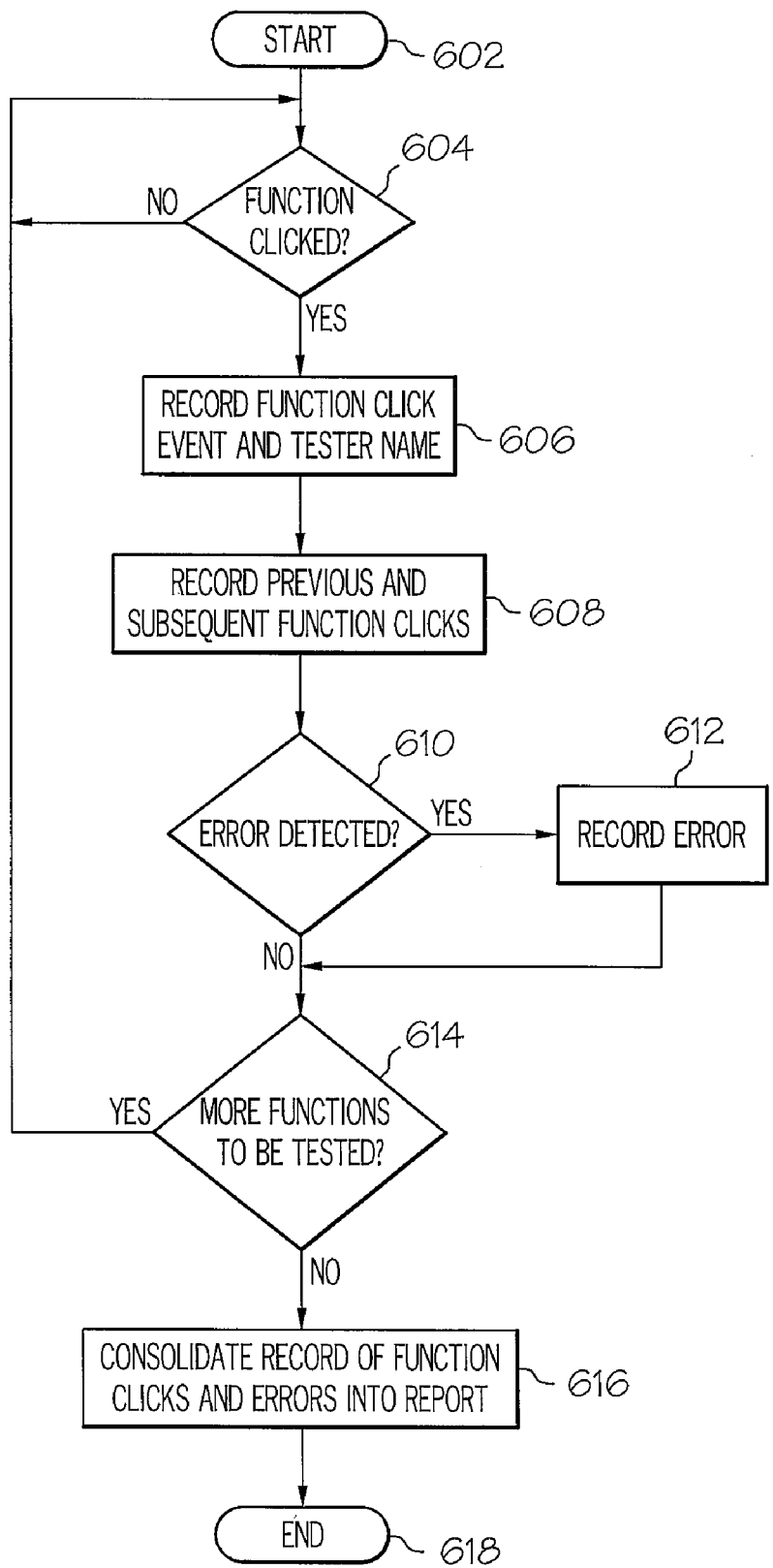
FIG. 6 is a flow-chart of exemplary steps taken to monitor testing of active areas in a GUI.
Figure 7:
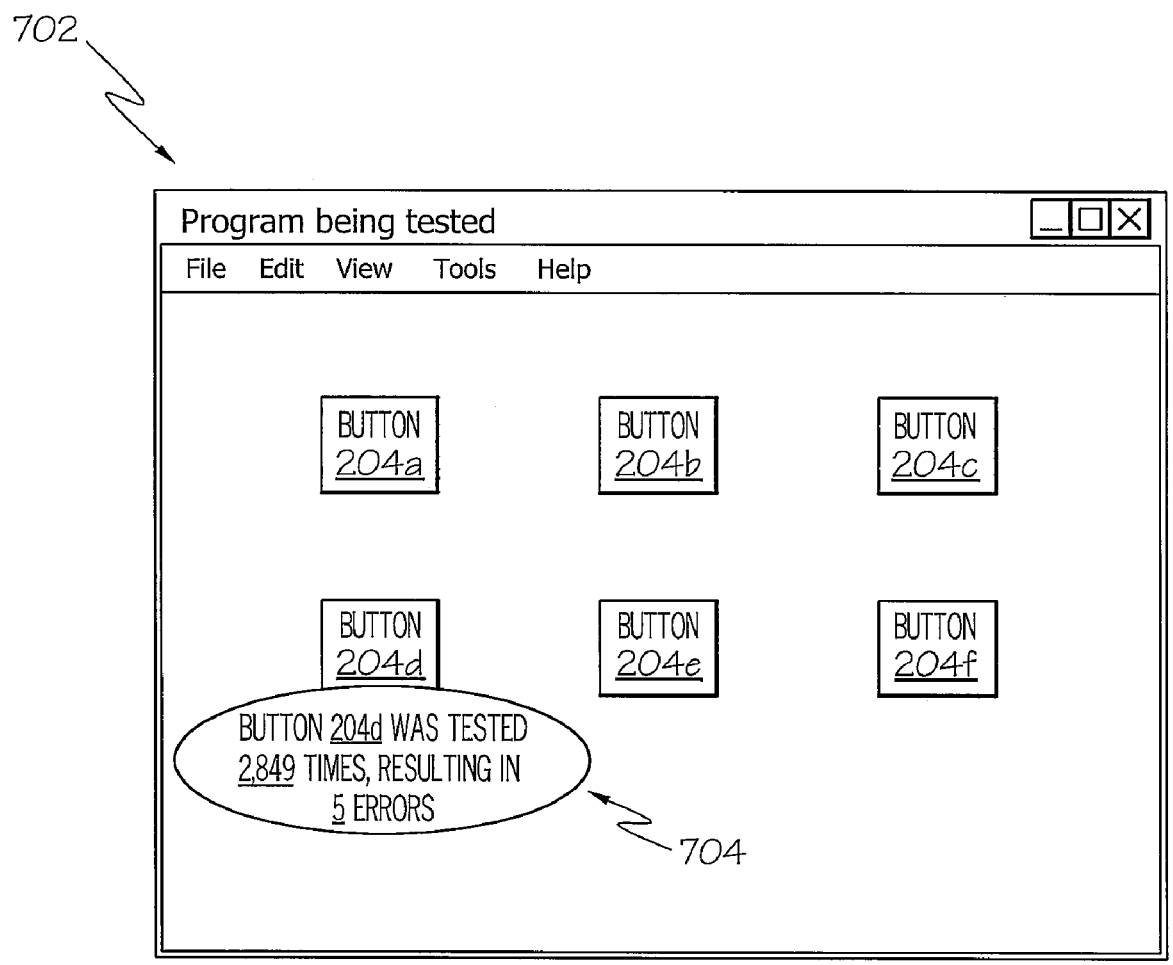
FIG. 7 depicts the GUI shown in FIG. 2 with additional pop-up information associated with a tested active area.

With reference now to FIG. 6, a flow-chart of exemplary steps taken to test and evaluate active areas in a GUI is presented. In a preferred embodiment, the processes described in FIG. 3-5 for collecting test data for active areas are utilized to provide underlying data to be evaluated in accordance with the present disclosure.

After initiator block 602, which may be the initiation of a testing and monitoring of a newly developed or improved software application, a determination is made as to whether a function, such as a button, hot link, hot icon, etc., has been clicked (query block 604). If so, then the function that was clicked is recorded, as well as the name (or computer identifier) of the person or computer involved in the clicking event (block 606). As described in block 608, clicking events of other buttons that occurred before and after the currently tested clicked button, as well as the order in which they were clicked, are also recorded. Note that these "other" buttons may include any button in the GUI, including the button that is initially being monitored. In one embodiment, a test engineer may pre-determine how far back (previous clicks of the same or other functional areas such as buttons) or forward (subsequent clicks of the same or other functional areas such as buttons) this recording includes. For example, the test engineer may decide that for button 204*d* shown in FIG. 2, a record will be made of which three buttons 204 were clicked before button 204*d* was clicked, as well as which five buttons 204 were clicked after button 204*d* was clicked. Note that one or more buttons may be clicked more than once in these sequences.

If clicking the specifically monitored button (e.g., button 204*d*) causes an error, and/or if clicking the predetermined number of prior and subsequent buttons 204 causes an error (query block 610), this error is recorded (block 612), along with the sequence of button clicks that caused the error, which testers were involved, the time of day, what type of machine was running the program being tested when the error occurred, etc.

After all testing is completed (query block 614), the record of clicks and errors (if any) is consolidated into a final record (block 616), and the process ends. This final record can be incorporated into any type of report desired, including a graphical report, etc. In a preferred embodiment, however, an overall record for activity associated with each tested function can be presented as a pop-up window, such as bubble 704, which pops-up when a cursor is hovered over or "right clicked" on button 204*d*, as shown in the GUI 702 of FIG. 7. For example, during beta testing of the program being tested, button 204*d* was clicked (and thus tested) 2,849 times, which causes a total of five errors. By clicking on the bubble 704, which is itself an active functional area, more detail can be presented to the test engineer regarding the sequence(s) surrounding the activation, as well as information such as the number of errors associated with a particular sequence, and which sequences were never tested. For example, clicking bubble 704 may result in an exemplary table 802, a portion of which is shown in FIG. 8, being displayed on a new window or a new page. Each entry in table 802 is related to button 204*d*, as suggested by each sequence including the letter "d" in the sequence. Each letter in the sequences depicted indicates an order in which button 204*d* and other buttons 204*a-f* were clicked. Thus, sequence "aaaad", shown in the first row, shows information regarding how often the sequence of clicking buttons 802*a*, then 802*a*, then 802*a*, then 802*a* and then 802*d* occurred, and what (if any) errors resulted from this sequence of button clicks. As shown in table 802, the sequence "aaaad" was clicked fourteen times by the tester(s) (e.g., users of the program being tested at the multiple monitored computers 156 shown in FIG. 1), with no resultant errors. Similarly, clicking buttons 802*a, b, d* was tested in a sequence "aaabd" 23 times with no errors. However, clicking buttons 802*a, c, d* in the sequence "aaacd", which occurred 137 times, resulted in one error. Note also that table 802 shows other sequences that never occurred, and thus were never tested. For example, clicking the buttons 802*a*, then 802*a*, then 802*a*, then 802*e*, and then 802*d* ("aaaed") never occurred, and thus this sequence was never tested. Such non-testing is also critical in an overall evaluation of test results for a program being tested. While the sequence of clicks, times tested and number of errors recorded, as shown in table 802 of FIG. 8, are exemplary in manner, table 802 may also include other test parameters, including but not limited to the names of the testers and/or their computers, the time of day of a click sequence, what type of machine was running the program being tested when an error did or did not occur, etc. Returning now to FIG. 6, the test monitoring process ends at terminator block 618.

It should be understood that at least some aspects of the present invention may alternatively be implemented in a computer-useable medium that contains a program product. Programs defining functions of the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

The present disclosure thus presents a method, system, and computer-readable medium for calculating software test coverage of a Graphical User Interface (GUI). In one embodiment, the method includes the steps of: detecting an activation of a monitored active area in a GUI; recording the activation and a name of a user who activated the monitored active area; recording an order of any prior and subsequent activations of active areas in the GUI, wherein the prior and subsequent activations are performed prior to and subsequent to the activation of the monitored active area; recording any errors associated with the activation of the monitored active area; recording a total number of times that the monitored active area was activated during a pre-determined test period; and creating a report that describes test results for the monitored active area, wherein the report describes how many times the monitored active area was activated, error information related to activations of the monitored active area, and which active areas were and were not tested.

The prior and subsequent activations may include at least one activation of the monitored active area, such as a button, that was originally being monitored and tested. In a preferred embodiment, the monitored active area is duplicated and presented on multiple monitored computers, wherein the report consolidates information regarding activation frequency for, and errors associated with, all duplicated monitored active areas on the multiple monitored computers.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A processor-implemented method comprising:
a processor detecting an activation of a monitored active area in a GUI;
the processor recording the activation and a name of a user who activated the monitored active area;
the processor recording a total number of times that the monitored active area was activated during a pre-determined test period;
the processor detecting which other active areas in the GUI were activated during the pre-determined test period;
the processor determining which other active areas in the GUI were not activated during the pre-determined test period;
the processor determining multiple patterns of active area activations, wherein each of the multiple patterns of active area activations describes an activation sequence in which the other active areas were activated before and after the monitored active area was activated during multiple testings of the GUI;
the processor identifying and recording how many errors resulted from each of the multiple patterns of active area activations;
the processor creating a report that describes test results for the monitored active area, wherein the report describes how many times the monitored active area was activated during the pre-determined test period, which active areas were and were not activated during the pre-determined test period, a frequency of each of the multiple patterns of active area activations, and any error caused by each of the multiple patterns of active area activations, wherein the report is used to create a draft of an aggregate test procedure draft;
the processor analyzing the aggregate test procedure draft to identify failure points common to two or more executions of an individual test of the monitored active area;
the processor analyzing the aggregate test procedure draft to identify operating anomalies and disparities of the individual test runs;
the processor amending the individual test to create a modified aggregate test procedure based on the identified failure points that are common to two or more executions of the individual test and the identified operating anomalies and disparities of the individual test runs; and
implementing the modified aggregate test procedure on a testing server for automated testing of the monitored active area.

2. The processor-implemented method of claim 1, wherein the multiple patterns of active area activations include at least one activation of the monitored active area.

3. The processor-implemented method of claim 1, wherein the monitored active area is a button.

4. The processor-implemented method of claim 1, wherein the monitored active area is duplicated and presented on multiple monitored computers, and wherein the report consolidates information regarding activation frequency and sequence context for, and errors associated with, all duplicated monitored active areas on the multiple monitored computers.

5. A system comprising:
a processor;
a data bus coupled to the processor;
a memory coupled to the data bus; and
a computer-usable medium embodying computer program code, the computer program code comprising instructions executable by the processor and configured for calculating software test coverage of a Graphical User Interface (GUI), wherein the instructions are configured to perform the steps of:
detecting an activation of a monitored active area in a GUI;
recording the activation and a name of a user who activated the monitored active area;
recording a total number of times that the monitored active area was activated during a pre-determined test period;
detecting which other active areas in the GUI were activated during the pre-determined test period;
determining which other active areas in the GUI were not activated during the pre-determined test period;
determining multiple patterns of active area activations, wherein each of the multiple patterns of active area activations describes an activation sequence in which the other active areas were activated before and/or after the monitored active area was activated during multiple testings of the GUI;
identifying and recording how many errors resulted from each of the multiple patterns of active area activations;
creating a report that describes test results for the monitored active area, wherein the report describes how many times the monitored active area was activated during the pre-determined test period, which active areas were and were not activated during the pre-determined test period, a frequency of each of the multiple patterns of active area activations, and any error caused by each of the multiple patterns of active area activations, wherein the report is used to create a draft of an aggregate test procedure draft;

analyzing the aggregate test procedure draft to identify failure points common to two or more executions of an individual test of the monitored active area;

analyzing the aggregate test procedure draft to identity operating anomalies and disparities of the individual test runs;

amending the individual test to create a modified aggregate test procedure based on the identified failure points that are common to two or more executions of the individual test and the identified operating anomalies and disparities of the individual test runs; and implementing the modified aggregate test procedure on a testing server for automated testing of the monitored active area.

6. The system of claim 5, wherein the multiple patterns of active area activations include at least one activation of the monitored active area.

7. The system of claim 5, wherein the monitored active area is a button.

8. The system of claim 5, wherein the monitored active area is duplicated and presented on multiple monitored computers, and wherein the report consolidates information regarding activation frequency for, and errors associated with, all duplicated monitored active areas on the multiple monitored computers.

9. A non-transitory computer-readable medium encoded with a computer program, the computer program comprising computer executable instructions configured for:

detecting an activation of a monitored active area in a GUI;

recording the activation and a name of a user who activated the monitored active area;

recording a total number of times that the monitored active area was activated during a pre-determined test period;

detecting which other active areas in the GUI were activated during the pre-determined test period;

determining which other active areas in the GUI were not activated during the pre-determined test period;

determining multiple patterns of active area activations, wherein each of the multiple patterns of active area activations describes an activation sequence in which the other active areas were activated before and/or after the monitored active area was activated during multiple testings of the GUI;

identifying and recording how many errors resulted from each of the multiple patterns of active area activations;

creating a report that describes test results for the monitored active area, wherein the report describes how many times the monitored active area was activated during the pre-determined test period, which active areas were and were not activated during the pre-determined test period, a frequency of each of the multiple patterns of active area activations, and any error caused by each of the multiple patterns of active area activations, wherein the report is used to create a draft of an aggregate test procedure draft;

analyzing the aggregate test procedure draft to identify failure points common to two or more executions of an individual test of the monitored active area;

analyzing the aggregate test procedure draft to identify operating anomalies and disparities of the individual test runs;

amending the individual test to create a modified aggregate test procedure based on the identified failure points that are common to two or more executions of the individual test and the identified operating anomalies and disparities of the individual test runs; and implementing the modified aggregate test procedure on a testing server for automated testing of the monitored active area.

10. The non-transitory computer-readable medium of claim 9, wherein the multiple patterns of active area activations include at least one activation of the monitored active area.

11. The non-transitory computer-readable medium of claim 9, wherein the monitored active area is a button.

12. The non-transitory computer-readable medium of claim 9, wherein the monitored active area is duplicated and presented on multiple monitored computers, and wherein the report consolidates information regarding activation frequency for, and errors associated with, all duplicated monitored active areas on the multiple monitored computers.

13. The non-transitory computer-readable medium of claim 9, wherein the non-transitory computer-readable medium is a component of a remote server, and wherein the computer executable instructions are deployable to a supervisory computer from the remote server.

14. The non-transitory computer-readable medium of claim 9, wherein the computer executable instructions are capable of being provided by a service provider to a customer on an on-demand basis.

* * * * *